Patented June 5, 1945

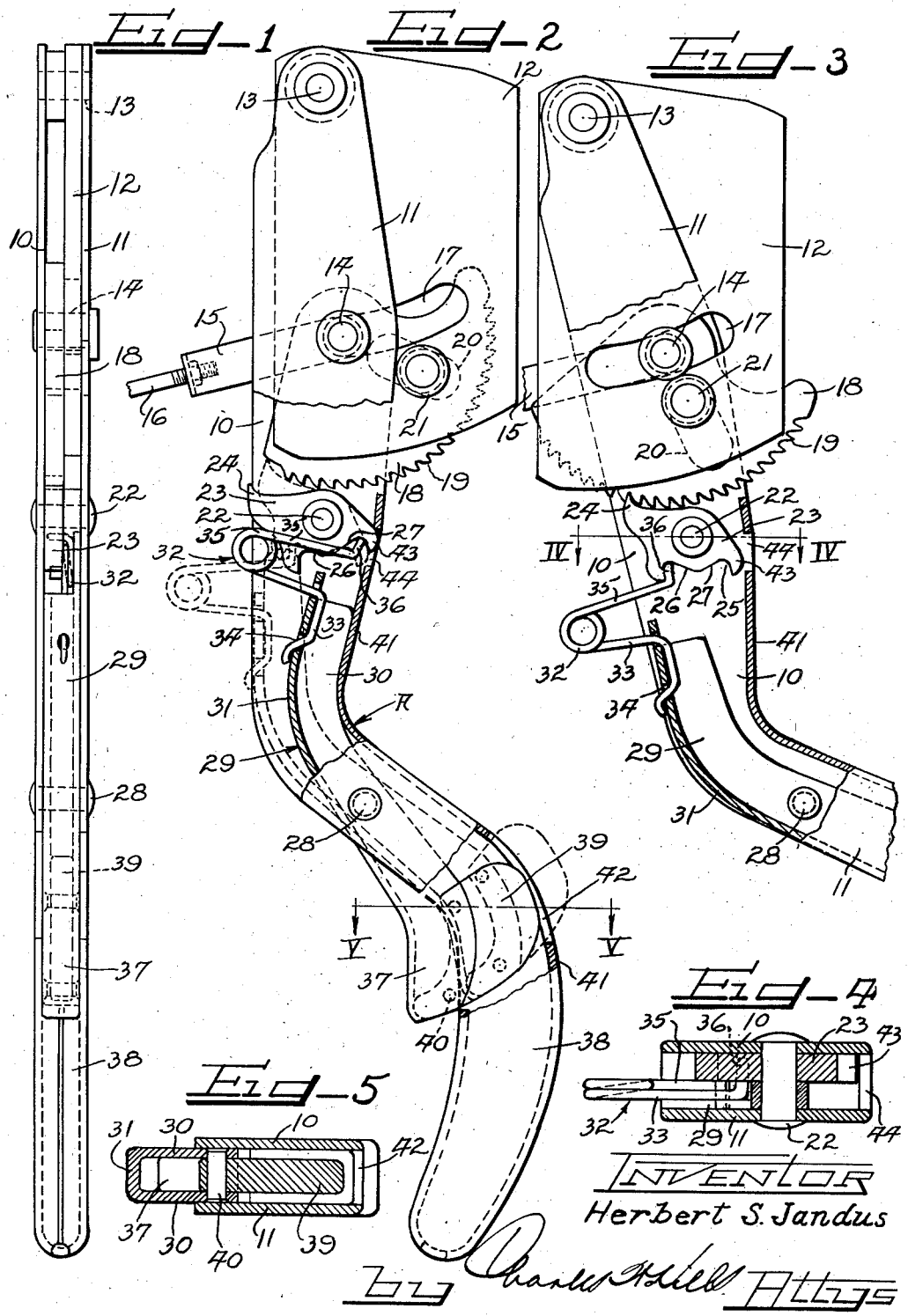

2,377,690

UNITED STATES PATENT OFFICE 2,377,690

BRAKE LEVER ASSEMBLY

Herbert S. Jandus, Detroit, Mich., assignor to Houdaille-Hershey Corporation, Detroit, Mich., a corporation of Michigan Application May 22, 1944, Serial No. 536,735

6 Claims. (Cl. 74—537)

My invention relates to brake lever assembly, particularly to hand operated emergency brake lever assembly for automobiles.

Emergency brake levers usually comprise a ratchet sector mounted behind the instrument board of an automotive vehicle, and a brake lever connected with the brake and carrying a pawl for engagement with the sector teeth. A manually operated release for the pawl is usually mounted on the handle for operation to withdraw the pawl from the sector teeth when it is desired to swing the lever for release of the brakes. One of the chief difficulties encountered in the ordinary brake installation is the possibility of the pawl not being completely disengaged from the ratchet teeth when the brakes are to be released. In many cases the operator, using the manually operated release, lets go of the release before the brake lever is completely at the end of its "off" position, with the result that the pawl is spring returned back into engagement with one of the teeth near the end of the sector to thereby hold the brake in a slightly engaged position which may cause the brake to drag.

An important object of the invention is to provide means on the brake lever which, upon setting by the driver when it is desired to swing the brake lever for release of the brake, will rock the pawl to its release or inoperative position and will then hold it in such position independently at the driver's hand in order that the force of the brake release springs may then swing the brake lever into its fully "off" position without the possibility of the pawl engaging with sector teeth before such position is reached.

Another object is to provide means on the brake lever which, when the brake is to be swung for brake setting may be manually operated by the driver for rocking of the pawl back into operative position and to then hold it there independently of the driver's hand for cooperation of the pawl with the ratchet sector for holding the brake in "on" position.

A further object is to provide over center spring means on the brake lever for engaging with the pawl to snap it quickly into its release position after rocking thereof from its operative position, and to snap it quickly into its operative position when rocked out of its release position.

Still another object is to provide a pawl actuating lever on the brake lever which may be manually operated by the driver for positive movement of the pawl into either operative or inoperative position and, furthermore, to connect the actuating lever with the pawl by over center spring connection for snap action of the pawl.

Still another object is to provide an arrangement whereby the pawl setting lever is accessible at the front side of the brake lever for manual operation for setting of the pawl into inoperative position when the brake lever is to be moved forwardly for brake release, and accessible at the front side of the brake lever for setting of the pawl into operative position when the lever is to be pulled rearwardly for bake setting.

The above referred to and other objects and features of the invention will be clearly understood from the following detail specification in connection with the drawing, in which drawing:

Figure 1 is a front elevation of the brake lever assembly;

Figure 2 is a side elevation, partly in section with the lever in brake release position;

Figure 3 is a view similar to Figure 2 showing the brake lever in brake setting position;

Figure 4 is an enlarged section on plane IV—IV Figure 3; and

Figure 5 is an enlarged section on plane V—V, Figure 2.

The lower portion of the brake lever A is of S-shape and of channel or U-shape cross-section, its side walls 10 and 11 at the upper portion thereof receiving between them the supporting plate 12 which may form part of a bracket secured in position behind the instrument board of an automotive vehicle. The walls are fulcrumed at their upper ends to the plate 12 as by a rivet 13. Extending between the walls 10 and 11 a distance downwardly from the fulcrum connection 13 is a pin 14 from which extends the link 15 for connection through a rod 16 with the brake to be controlled. The pin extends through an arcuate slot 17 in the plate 12 whose center of curvature is in the fulcrum 13. On the pin 14 is also supported the ratchet sector 18 having the ratchet teeth 19. This ratchet sector has the slot 20 therethrough extending radially from the pin 14 and receiving a stud 21 extending from the plate 12. The arrangement thus far described is substantially like that disclosed in my Patent No. 2,120,362, dated June 14, 1938.

A pin 22 extending between the lever side walls 10 and 11 below the sector 18 supports the pawl 23. At its front end this pawl has the point 24 for ratchet engagement with the teeth 19 on the sector when the lever is swung for brake setting. In its lower side the pawl is cut away to leave the recess 25 extending forwardly and rearwardly of the fulcrum pin 22, the bottom of the recess presenting front and rear incline surfaces 26 and 27 which meet at the middle of the recess.

At the middle part of the S-shaped lower portion of the brake lever, a pivot pin 28 extends between the side walls 10 and 11 to fulcrum the pawl actuating or setting lever 29 which is of S-shape and of U-shape cross section. The lever 29 has side walls 30 extending rearwardly in engagement with the side walls 10 and 11 of the brake lever. At the upper end of the front wall 31 of the lever 29 is supported a spring 32, shown as of the hairpin type, whose lower leg 33 is threaded through holes 34 in the wall 31 and whose upper leg has its ends 36 bent laterally at right angles therefrom. As best shown on Figure 4, the spring is at one side of the pawl so as not to interfere with the rocking of the pawl, the spring end 36 extending laterally into the pawl recess 25 for control of the pawl by the spring.

Figure 2 shows the spring lever in brake release position, while Figure 3 shows the lever in brake setting position. With the arrangement of the spring 32 as shown, when the pawl setting lever 29 is rotated in clockwise direction from the brake setting position shown on Figure 3, the end 36 of the spring will travel along the forward incline 26 of the pawl recess forwardly of the pawl fulcrum axis, and then into engagement with the incline 27 rearwardly of the pawl fulcrum axis so that the spring will snap the pawl into its inoperative or release position shown on Figure 2, and when the lever 29 is rotated in counterclockwise direction from its position in Figure 2, the spring end 36 will engage with the pawl surface 27 and then with the pawl surface 26 forwardly of the pawl axis to quickly snap the pawl into operating position for engagement of its point with the teeth of the ratchet sector.

The lower end 37 of the pawl actuating lever 29 projects forwardly of the brake lever A above the lower end or grip portion 38 of the lever after the lever has set the pawl into release position, as shown on Figure 2. Secured to and extending rearwardly from the lower end 37 of the lever 29 is a plate 39. As shown, the plate engages at its forward end between the sides 30 of the lever 29 and is secured thereto as by rivets 40. The rear end of the plate 39 is rounded, and in the rear wall 41 of the brake lever is a slot 42 through which the plate projects when the lever 29 is rotated in counterclockwise direction.

On Figure 2 the full lines show the lever 29 at the end of its clockwise rotation with its upper end abutting the wall 41 of the brake lever and with its lower end 37 projected forwardly of the brake lever and with the plate 39 withdrawn within the brake lever, the spring 32 holding the pawl in its inoperative position with its point 24 withdrawn from the ratchet sector 18. The brake is now entirely released. For setting of the brakes, the brake lever is gripped at its lower end 38 and pressure is applied by the forefinger against the end 37 of the lever 29 for counterclockwise rotation of this lever for movement of the spring end 36 into the forward end of the pawl recess 25 for snapping of the pawl into operative position with its point 24 against the smooth portion of the ratchet sector 18 in advance of the ratchet teeth, as shown by the dotted lines of Figure 2. The counterclockwise rotation of the lever 29 to set the pawl into operative position has carried the lower end 37 of the lever into the brake lever and the plate 39 was projected outwardly through the slot 42 in the brake lever, as indicated by the dotted lines on Figure 2. As the brake lever is now swung rearwardly for setting of the brake, the pawl will travel along the ratchet teeth for locking the brake lever in brake setting position. To release the brake, the driver grasps the brake lever and with his thumb presses forwardly against the plate or button 39 for clockwise rotation of the pawl setting lever 29, the end 36 of the spring then coming into engagement with the rear end of the pawl recess 25, the spring pressure tending to rock the pawl away from the ratchet sector. However, the pressure friction of the pawl against the tooth engaged thereby may prevent the spring from releasing the pawl but, by a slight pull on the brake lever this pressure will be relieved and the spring will then snap the pawl into its release position shown on Figure 2, the tail end 43 of the pawl being then held by the spring against the upper edge of a slot 44 provided in the wall 41 of the brake lever. When the pawl is set to its inoperative position by the rotation of the lever 29 by pressure against the front plate 39, the lever and the pawl will be held in this position by the spring 32. The spring acting against the tail end 43 of the pawl and the upper end of the lever 29 may tend to rotate the lever in counterclockwise direction, but to do so the spring end 36 would have to travel forwardly along the incline 27 of the pawl recess and this would tend to compress the spring, and the resistance to this compression of the spring would hold the spring in the position shown in Figure 2 with the lever 29 held with its upper end against the wall 41 of the brake lever and with the pawl held in its inoperative position. Thus, after the thumb plate 39 has been depressed by the driver and the pawl has been set to its inoperative position, there is no chance of the pawl being returned to operative position into engagement with the ratchet sector, so that full brake release is at all times assured and brake drag prevented. The pawl will be held in its inoperative position after release of the brake and will not come back into its operative position until the lever 29 is rotated by pressure against the lower end 37 of the lever when the brake lever is to be swung for resetting of the brake.

I have thus produced an efficient brake lever in which the ratchet pawl is quickly set by snap action into either operative or inoperative position relative to the ratchet sector and after such setting is automatically held in set position until positively released by the driver, thus eliminating the occurrence of brake drag.

Although I have shown a practical and efficient embodiment of the features of my invention, I do not desire to be limited to the exact construction, arrangement and operation shown and described as changes and modifications may be made without departing from the scope of the invention as defined by the appended claims.

I claim as my invention:

1. A brake lever assembly comprising a support, a brake lever fulcrumed to said support for forward and rearward swing, a pawl pivoted intermediate its forward and rear ends on said lever below the lever fulcrum point, a ratchet sector mounted above said pawl for engagement of the pawl with the sector teeth when said brake lever is swung, a pawl actuating lever fulcrumed on said brake lever below said pawl, and a spring on said actuating lever having cross pivot connection with said pawl whereby upon manual operation of said actuating lever said pawl will be snapped either into operative position for engagement with the ratchet sector teeth or into operative position away from the teeth.

2. A brake lever assembly comprising a support, a brake lever fulcrumed on said support for forward and rearward swing, a pawl pivoted intermediate its front and rear ends on said lever, a ratchet section adjacent to said pawl for engagement of the pawl with the ratchet teeth when the lever is swung, spring means for engaging said pawl at opposite sides of its pivot for snap movement of the pawl into operative or inoperative position relative to the ratchet sector teeth, and a manually operable actuating lever on said brake lever for controlling the application of said spring means to said pawl.

3. A brake lever assembly comprising a support, a brake lever fulcrumed at its upper end on said support to swing forwardly or rearwardly and having a grip end, a pawl pivoted intermediate its forward and rear ends on said lever, a ratchet sector above said pawl, a pawl setting lever fulcrumed intermediate its ends on said brake lever below said pawl, a hairpin spring anchored by its lower leg to the upper end of said setting lever with its upper leg adapted for engagement with the pawl at opposite sides of the pawl pivot whereby to cause snap movement of said pawl into operative or inoperative position relative to said ratchet sector when said setting lever is rotated, the lower end of said setting lever terminating above the grip end of said brake lever for manual operation of the setting lever for the desired setting of said pawl.

4. A brake lever assembly comprising a support, a brake lever fulcrumed at one end to said support for forward and rearward swing, a pawl pivoted intermediate its front and rear ends on said lever, a ratchet sector between the lever fulcrum and said pawl for engagement by said pawl when said lever is swung rearwardly for brake setting, a setting lever fulcrumed intermediate its ends on said brake lever below said pawl, a spring connection between the upper end of said setting lever and said pawl effective upon rotation of said setting lever to set said pawl for cooperation with said ratchet sector for brake setting or to release said pawl therefrom, said setting lever being manually engageable at its lower end for rotation thereof in either direction, and means whereby said connection will cooperate with said pawl to automatically lock said actuating lever and pawl in pawl release position when said actuating lever has been manually rotated for such setting whereby complete release of the brake is assured and brake drag prevented, manual rotation of said lever in the opposite direction releasing said lever and the pawl for return of the pawl to operative position for resetting of the brake.

5. A brake lever assembly comprising a support, a brake lever fulcrumed at its upper end to the support for forward and rearward swing, a pawl pivoted intermediate its forward and rear ends on said lever, a ratchet sector above the pawl, a setting lever pivoted intermediate its ends on said brake lever below said pawl, said pawl in its lower side having a recess extending to opposite sides of the pawl pivot center, a hairpin spring connected by its lower leg to the upper end of said setting lever and having its upper leg engaged with the pawl in said recess, whereby when said setting lever is rotated in one direction or the other said spring will rotate said pawl into either operative position or release postion relative to said ratchet sector, said setting lever being manually engageable at its lower end for rotation in either direction, said pawl recess at its rearward end presenting an inclined surface along which the upper leg of said spring engages by the expansion of said spring when said setting lever is manually rotated for release of the pawl, said inclined surface functioning to automatically hold the spring, and the setting lever in pawl release position to permit full release of the brake, manual rotation of said setting lever in the opposite direction releasing said spring from said inclined surface for return of the pawl and lever by said spring to operative position.

6. A brake lever assembly comprising a support, a brake lever fulcrumed on said support, a ratchet sector, a pawl on said brake lever, a pawl setting lever fulcrumed on said brake lever, means on said setting lever manually engageable by the driver, when gripping the brake lever, for swinging the setting lever either for pawl release or pawl operation, and a connection between said setting lever and said pawl operative, when said setting lever is swung for pawl release or pawl operation, to first set the pawl and then to hold the pawl and setting lever against reverse movement until the setting lever is positively manually swung in reverse direction.

HERBERT S. JANDUS.